United States Patent
Laithwaite et al.

[15] 3,648,084
[45] Mar. 7, 1972

[54] LINEAR INDUCTION MOTORS

[72] Inventors: Eric Roberts Laithwaite, Surbiton; Hugh Robert Bolton, London, both of England

[73] Assignee: National Research Development Corporation, London, England

[22] Filed: June 16, 1970

[21] Appl. No.: 46,626

Related U.S. Application Data

[63] Continuation-in-part of Ser. No. 753,506, Aug. 19, 1968, abandoned.

[30] Foreign Application Priority Data

Aug. 31, 1967 Great Britain......................39,933/67

[52] U.S. Cl..............................................................310/13
[51] Int. Cl. .......................................................H02k 41/02

[58] Field of Search.....................................310/12–14, 172, 310/193; 104/148 LM; 318/121, 135; 198/41

[56] References Cited

UNITED STATES PATENTS 3,426,887  2/1969  Ward et al. ..........................310/13 X

*Primary Examiner*—D. F. Duggan
*Attorney*—Cushman, Darby and Cushman

[57] ABSTRACT

The magnetic field of a linear motor is evenly distributed over the airgap between the primary and secondary members by providing a ladderlike grid structure of conductors at each side, by interleaving the laminations with conductive stampings near the sides, by strips of conductive material on or near the surface of the stator, or by chamfering the edges.

9 Claims, 3 Drawing Figures

Patented March 7, 1972

LINEAR INDUCTION MOTORS

This invention relates to linear induction motors and is a continuation-in-part of copending Pat. application Ser. No. 753,506, filed Aug. 19, 1968, now abandoned.

Such motors comprise a generally flat primary member comprising magnetic material and a winding in the form of a row of coils which are fed with alternating current to produce a magnetic field which travels along the primary member and a secondary member comprising an elongated electrical conductor in the form of a strip or rail and which in some applications may be the fixed member. In order to avoid magnetic forces at right angles to the direction of driving force, a pair of primary members may be positioned on opposite sides of the secondary member.

It has been found in practice that the magnetic field generated by the primary member tends to be noticeably greater at the side edges thereof resulting in saturation effects and inefficient use of the magnetic and conducting material of the primary and secondary members respectively.

It has previously been proposed to provide a region between the centerline of the primary member and the side edges thereof over which the magnetic field first decreases outwardly and thereafter is enhanced very considerably for the purpose of providing a self-centering force between the primary and secondary members. While this results in a desired self-centering force for certain kinds of motor, in other linear motors such self-centering forces are not necessary and this provision only increases saturation effects at the side edges of the primary member thus causing relatively inefficient use of the whole of the magnetic material of the primary member.

It is an object of the invention to provide a construction by which, without increasing the complexity of the secondary member, the magnetic field of the motor is more evenly distributed to reduce undesirable saturation effects at the side edges.

Accordingly the present invention comprises a linear motor in which the primary member is provided with flux reducing means for effectively reducing the density of the magnetic field at the side edges thereof to produce a substantially uniform field in the airgap.

In carrying out the invention the said means may comprise an airgap which increases in size towards the side edges of the primary member, for example by providing the magnetic primary member with bevelled or chamfered edges. Alternatively, the said means comprises electrically conductive material provided in the neighborhood of the side edges of the primary member and positioned to allow the magnetic field of the primary member to generate circulating currents therein.

The conducting material may be in the form of a series of closed loops which may be parallel to the surface of the primary member. The loops may be contiguous so as to form ladderlike grid structures at each side of the primary member. The grid structures may include one or more members lying in longitudinal slots in the surface thereof and one other member lying outside the edge of the primary member to provide a return path for circulating current. Alternatively, the conducting material may take the form of thin strips lying parallel to the surface of the primary member. In another alternative arrangement the conducting material may be positioned in one or more planes lying perpendicular to the surface of the primary member, and may take the form of thin strips of conducting material interleaved with the laminations of magnetic material near the side edges thereof.

In order that the invention may be more fully understood reference will now be made to the accompanying drawings in which.

Figure 2:
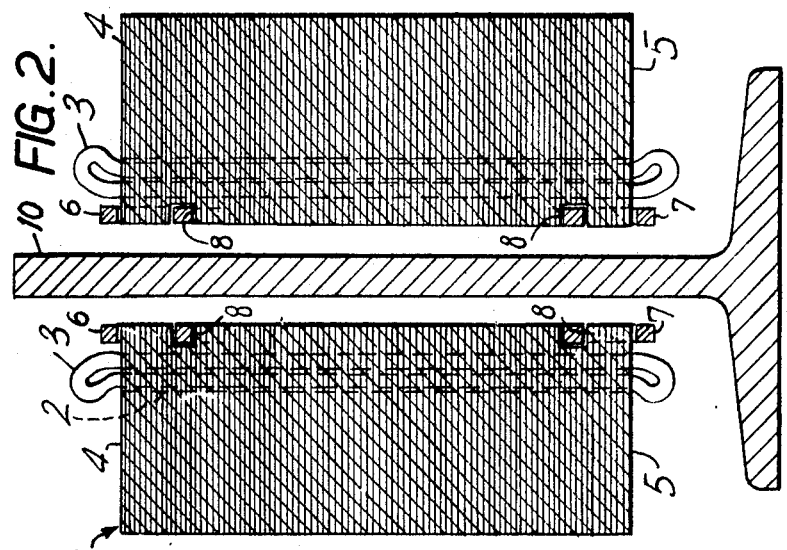
FIG. 2 is a section through the motor.
Figure 1:
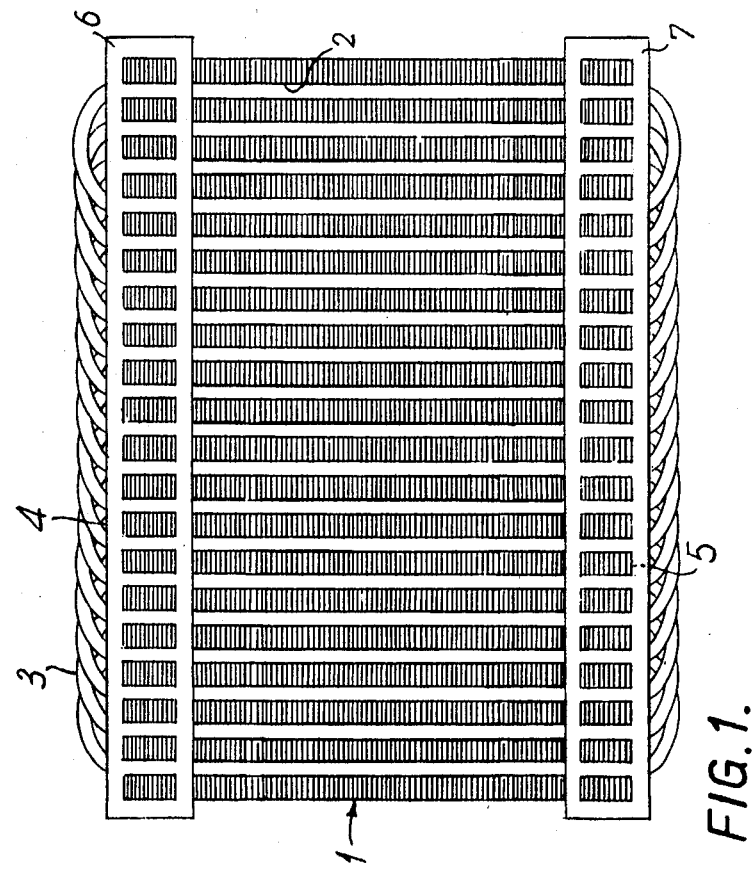
FIG. 1 illustrates a linear motor primary member embodying the invention in plan view.

In FIG. 1 and FIG. 2 a primary member 1 of a linear motor comprises a stack of laminations of magnetic material forming a block in which there is provided in one surface thereof a plurality of slots 2 filled with the sides of coils 3 forming a multiphase, usually three-phase, winding designed to provide a magnetic field travelling along the surface of primary member 1 at right angles to the slots. The complete linear motor normally comprises a pair of primary members 1 positioned facing each other and between which an elongated secondary member 10 of conducting material is positioned. Secondary member 10 may comprise a fixed rail extending along, say, a railway or other track and the primary members may be secured to a vehicle designed to travel along that track.

It has been found in practice that the magnetic field generated in the primary members tends to be concentrated towards the side edges 4 and 5 thereof, so that the iron near the center of a primary member is not fully used and losses due to saturation effects are likely to occur. To overcome this effect, electrically conducting material is provided in the neighborhood of the side edges 4 and 5. The material is positioned to allow the magnetic field of the primary to produce circulating currents therein and thereby reduce the magnitude of the magnetic field at the side edges. One arrangement for the conducting material is illustrated in the figure and comprises two ladderlike grids 6 and 7. Each grid comprises one conducting member extending longitudinally of the primary member and lying in a longitudinal slot located near the side of the primary member and a second longitudinal conducting member positioned beyond the edge of the primary member. The two longitudinal members are joined by short crossmembers which may lie in the slots 2. It will be seen that each grid forms a contiguous series of closed conducting loops in which circulating currents will be induced by the magnetic field of the primary and these currents in accordance with well-known principles will tend to cancel the magnetic fields inducing them and so reduce the intensity of the magnetic field at the side edges.

The arrangement illustrated in the figures may be modified by providing further longitudinally extending conducting members which form part of the grids. An ideal arrangement would be a large number of longitudinal members of graded sized or conductivity. Alternatively, instead of the gridlike pattern the conducting material may simply comprise thin sheets fastened to the surface of the primary. The thickness of these sheets should be considerably less than that of the plate 10 and the optimum ratio of thickness of the sheets to the thickness of the secondary is equal to the fractional slip at full load, although satisfactory results are possible for other ratios.

Alternatively, in place of conducting material lying in planes parallel to the surface of the primary, conducting sheets may be provided at right angles thereto, for example, by interleaving the magnetic laminations near the side edges of the primary with copper foil of similar shape. It is not necessary to provide copper foil between every lamination as the total thickness of copper need only be a fraction of the thickness of the secondary member. The conducting material should be limited to the neighborhood of the side edges of the primary up to a maximum of about 30 percent of the width of the primary from each side.

Figure 3:
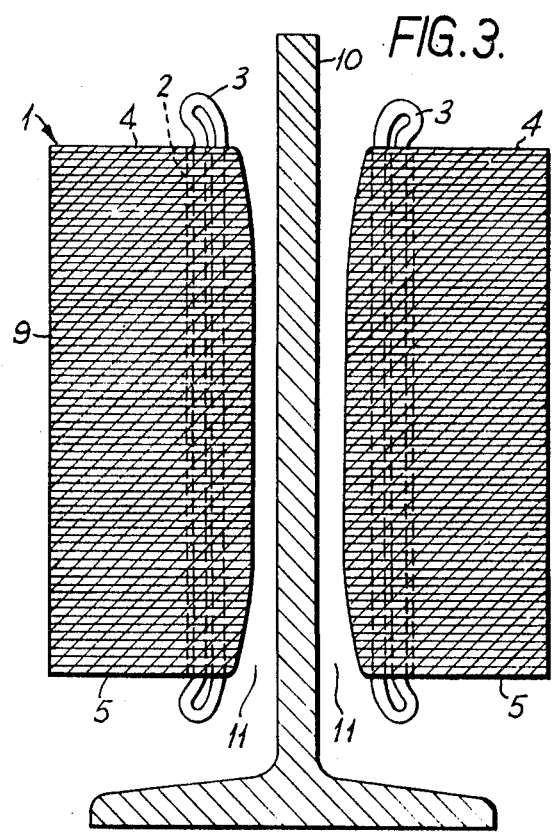
FIG. 3 illustrates an alternative embodiment of the invention in section.

As an alternative to providing conducting material to decrease the magnetic field in the neighborhood of the side edges of the primary member, a similar result can be obtained by chamfering the magnetic laminations of the primary member at both sides so that an airgap is obtained which progressively increases in dimensions in the region in which the grids 6 and 7 are provided in the arrangement shown in FIG. 1 and FIG. 2. Such an arrangement is illustrated in FIG. 3 in which like parts have like reference numerals to the arrangement illustrated in FIG. 1 and FIG. 2. FIG. 3 illustrates a primary member 1 of a linear motor which comprises a stack of laminations 9 of magnetic material forming a block in which there is provided in one surface thereof a plurality of slots 2 filled with the sides of coils 3 forming a multiphase, usually three-phase, winding which provides a magnetic field travelling along the surface of primary member 1 at right angles to the slots. A pair of primary members 1 are positioned facing each other and between them there is a secondary member 10 of conducting material. Secondary member 10 may comprise a fixed rail extending along, say, a railway or other track and the primary members may be secured to a vehicle designed to travel along that track.

The magnetic field generated in the primary tends to be concentrated towards the side edges 4 and 5 thereof so that the iron of the laminations 9 near the centerline of a primary member is not fully used and losses due to saturation effects near the edges are likely to occur. To overcome this effect the surfaces of the laminations 9 facing the airgap 11 between the primary and secondary members are shaped so that the airgap 11 is a minimum along the centerline and a maximum at the side edges 4 and 5. Since the major part of the saturation effect occurs near the side edges it is sufficient for airgap 11 to be of relatively constant width except in the neighborhood of the side edges where it is increased by having the laminations chamfered or bevelled.

While in FIG. 2 and FIG. 3 a pair of primary members are illustrated which are positioned on either side of a secondary member, it will be appreciated that the invention is equally applicable to a linear motor in which a primary member is provided on one side only.

We claim:

1. A moveable primary member for a linear electromagnetic motor producing substantially no self-centering forces and having a fixed secondary member made of electrically conductive material and an airgap between said primary member and said secondary member, said primary member comprising:

a block of magnetically permeable material having side edges and slots in the surface thereof adjacent to said airgap, an electrical winding positioned in said slots for generating a travelling magnetic field in a magnetic circuit including said block, said airgap and said secondary member, and flux reducing means for effectively reducing the density of said magnetic field at the said side edges to produce a substantially uniform field over the entire surface of said primary member which is adjacent to said airgap including an electrically conducting member extending outside the side edges of said block and positioned with respect to said block so that the magnetic field generated by said winding generates circulating currents in said member to reduce the density of said field at said side edges.

2. The primary member as claimed in claim 1 in which the conducting material is in the form of a series of closed loops parallel to the surface of the block.

3. The primary member as claimed in claim 2 in which the loops are contiguous and form a ladderlike grid structure at each side of the block.

4. The primary member as claimed in claim 3 in which each grid structure includes at least one member lying in a longitudinal slot in the surface of the block and one other member lying outside the side edge of the block to provide a return path for circulating current.

5. The primary member as claimed in claim 1 in which the conducting material is in the form of thin strips lying parallel to the surface of the block.

6. The primary member as claimed in claim 1 wherein said block is constructed of laminations of magnetically permeable material lying in planes generally perpendicular to said airgap, and said flux reducing means comprises strips of electrically conductive material interleaved between said laminations and located near the side edges of said primary member.

7. A linear motor primary member including electrically conducting material positioned in the neighborhood of the side edges thereof and extending beyond the side edges thereof so that the magnetic field of the primary member generates circulatory currents therein to reduce the magnetic field at the side edges, said conducting material being in the form of closed loops parallel to the surface of said primary member, said loops being contiguous in the form of a ladderlike grid structure at each side of said primary member, and wherein, each said grid structure includes; at least one member lying in a longitudinal slot in the surface of said primary member, and one other member lying outside the edge of said primary member to provide a return path for circulating current.

8. A moveable primary member for a linear electromagnetic motor producing substantially no self-centering forces and having a fixed secondary member made of electrically conductive material and an airgap between said primary member and said secondary member, said primary member comprising:

a block of magnetically permeable material having side edges and slots in the surface thereof adjacent to said airgap, an electrical winding positioned in said slots for generating a travelling magnetic field in a magnetic circuit including said block, said airgap and said secondary member, and flux reducing means for effectively reducing the density of said magnetic field at the said side edges to produce a substantially uniform field over the entire surface of said id primary member which is adjacent to said airgap, the said flux reducing means comprising the surface of said block adjacent to said airgap being shaped to provide an airgap which has a maximum width at the side edges of the block.

9. A moveable primary member for a linear electromagnetic motor producing substantially no self-centering forces and having a fixed secondary member made of electrically conductive material and an airgap between said primary member and said secondary member, said primary member comprising:

a block of magnetically permeable material having side edges and slots in the surface thereof adjacent to said airgap and shaped to provide an airgap which has a maximum width at the side edges of the block, and an electrical winding positioned in said slots for generating a travelling magnetic field in a magnetic circuit including said block, said airgap and said secondary member.

* * * * *